United States Patent [19]
Nakamura

[11] Patent Number: 5,732,403
[45] Date of Patent: Mar. 24, 1998

[54] METHOD AND APPARATUS FOR TRANSFERRING PAGE CONSTRUCTION DATA ACCORDING TO HIERARCHICAL PAGE DATA

[75] Inventor: Norihiko Nakamura, Kyoto, Japan

[73] Assignee: Dainippon Screen Mfg. Co., Ltd., Japan

[21] Appl. No.: 553,192

[22] Filed: Nov. 7, 1995

Related U.S. Application Data

[63] Continuation of Ser. No. 167,521, Dec. 14, 1993, abandoned.

[30] Foreign Application Priority Data

Dec. 14, 1992 [JP] Japan ................... 4-353554

[51] Int. Cl.⁶ ...................... G06F 17/00; G03G 21/00
[52] U.S. Cl. .................. 707/514; 707/517; 399/81
[58] Field of Search ................. 395/144–148, 395/776, 779; 399/81

[56] References Cited

U.S. PATENT DOCUMENTS

| | | | |
|---|---|---|---|
| 5,045,880 | 9/1991 | Evanitsky et al. | 355/200 |
| 5,105,283 | 4/1992 | Forest et al. | 358/401 |
| 5,119,206 | 6/1992 | Rourke et al. | 358/296 |
| 5,197,121 | 3/1993 | Miyoshi et al. | 395/146 |
| 5,388,192 | 2/1995 | Ohsawa et al. | 395/146 |
| 5,535,318 | 7/1996 | Motoyama et al. | 395/145 |
| 5,581,752 | 12/1996 | Inoue et al. | 395/601 |

FOREIGN PATENT DOCUMENTS

| | | |
|---|---|---|
| 0332557 | 9/1989 | European Pat. Off. . |
| 0408056 | 1/1991 | European Pat. Off. . |
| 0415529 | 3/1991 | European Pat. Off. . |
| 2254460 | 10/1992 | United Kingdom . |

OTHER PUBLICATIONS

Patent Abstract No. JP2309354, Dated Dec. 25, 1990, Layout System for Plate Making of Printing, vol. 15, No. 99.

Multimedia Publishing From a Database, AT&T Technical Journal 68(1989) Jul./Aug., No. 4, Short Hills, NJ, US—pp. 61–71.

*Primary Examiner*—Joseph R. Burwell
*Attorney, Agent, or Firm*—Ostrolenk, Faber, Gerb & Soffen, LLP

[57] ABSTRACT

A reproduction process system is provided for executing a variety of reproduction-related processes without individually specifying page construction data each time, thus improving working efficiency of each process worker. In such reproduction process system a magnetic disk unit includes a plurality of job name directories each having a plurality of page number sub-directories. Each page number sub-directory stores page layout data corresponding to a page specified by the page number, picture data, and linework data. When the process worker specifies a desirable job name and a target page number, data of a target page corresponding to page layout data in a page number sub-directory specified by the desirable job name and the target page number are automatically displayed on a CRT screen.

30 Claims, 16 Drawing Sheets

QUARTO FOLDER

1FRONT　　1BACK　　2FRONT　　2BACK

Fig. 19 (a) TRAPPING
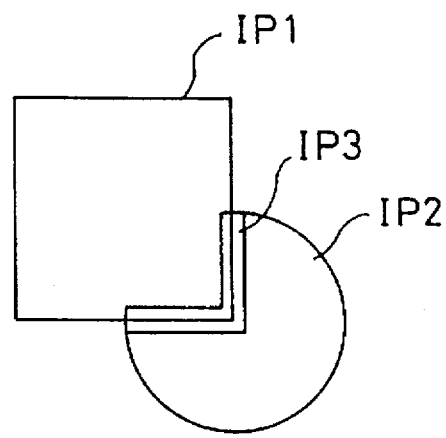
Fig. 19 (b) OUTLINE
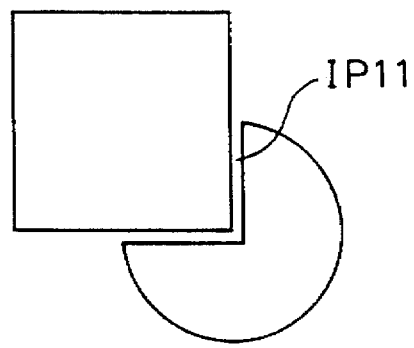
Fig. 19 (c) OVERPRINTING
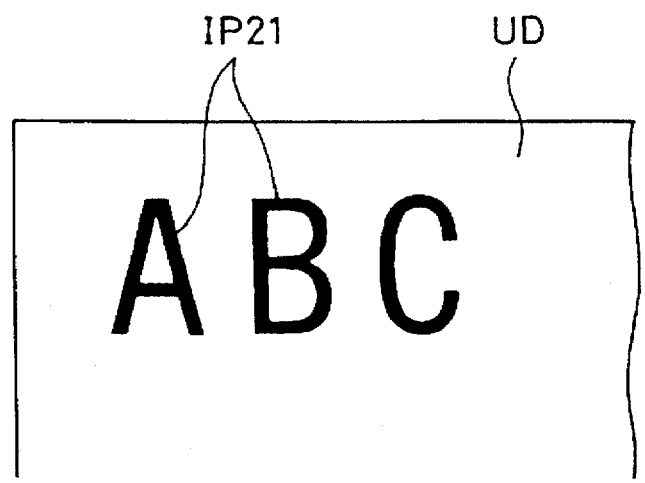

METHOD AND APPARATUS FOR TRANSFERRING PAGE CONSTRUCTION DATA ACCORDING TO HIERARCHICAL PAGE DATA

This is a continuation of application Ser. No. 08/167,521, filed on Dec. 14, 1993, now abandoned.

BACKGROUND OF THE INVENTION

1. Field of the Invention

The present invention relates to a method of executing reproduction related processes for a variety of prints and also to an apparatus used for executing a plurality of such reproduction-processes.

2. Description of the Related Art

Reproduction process systems are widely used to carry out a computer-aided page make-up process. Typically a reproduction process system executes a series of prepress works including a first reproduction process and a second reproduction process. In the first reproduction process, picture data, character data, linework data, and figure data are respectively input from an input scanner, a photo type setting machine, a linework input scanner, and a design system. In the second reproduction process, these data are processed for reproduction with one or a plurality of process terminals. The second reproduction process includes a routine of setting process information such as "Trapping", "Outline", or "Overprinting" in a mask area defined by figure data, and another routine of outputting finally assembled composite data to an output scanner.

In the first reproduction process, a variety of input data are temporarily stored in an external memory unit, such as a magnetic disk unit, before specific picture data is allocated in the form of a file to figure data defining a position of a mask area on a certain page. The figure data is then stored in the external memory unit as page layout data, which represents a file name of the specific picture data specified for the position of a mask area defined by the figure data. Page layout data and picture data and linework data attributed to the page layout data constitute page construction data.

In the second reproduction process, page layout data stored in the external memory unit is displayed on a monitor screen. A process worker specifies process information or executes another required process through interaction with the monitor screen. Not only page layout data but picture data and linework data specified by the page layout data are selected out of the external memory unit and displayed on the monitor screen. Since both the page layout data and the picture and linework data are stored in a specific position, for example, in a specific directory, in the external memory unit in the first reproduction process, the picture data or the linework data are not separately read out based on a data name specified by the page layout data.

A second process worker in the second reproduction process receives both a working instruction specifying required operations and a specification including file names of page layout data and those of picture or linework data prepared by a first process worker who executed the first reproduction process. The second process worker then specifies required page layout data and picture and linework data as working data according to the specification.

In a conventional system, the process worker selects and specifies required page construction data including page layout data, picture data, and linework data each time when the worker executes a reproduction-related process with a process terminal. This consumes substantial time and labor, thereby lowering working efficiency.

SUMMARY OF THE INVENTION

The object of this invention is to execute a variety of reproduction-related processes without individually specifying page construction data each time, thus improving working efficiency for each process worker.

The present invention is directed to reproduction process apparatus for executing a variety of reproduction-related processes, which apparatus comprises a memory for storing page construction data including page layout data and image part data. The page layout data represents positions of a plurality of image parts laid on one page, and the image part data represents the plurality of image parts. A working memory is provided for storing data used in execution of each of the variety of reproduction-related processes; a hierarchical memory for storing first hierarchy data including a plurality of job names each representing a print, second hierarchy data including a plurality of page numbers, and third hierarchy data including a plurality of names of the page construction data. Each of the plurality of job names have at least one page number as the second hierarchy data, and each of the plurality of page numbers have at least one name of the page construction data as the third hierarchy data. Page number specification means are provided for selecting a specific page number from the plurality of page numbers, and data transfer means are provided for comparing the specific page number with the second hierarchy data to extract at least one name of the page construction data corresponding to the specific page number from the third hierarchy data, and transferring the page construction data specified by the at least one name of the page construction data from the memory to the working memory.

In a preferred embodiment, the apparatus further comprises a plurality of process means for individually executing the variety of reproduction-related processes; process specification means for specifying a certain process; and selection means for selecting specific process means for executing the certain process out of the plurality of process means and activating the specific process means to execute the certain process according to data stored in the working memory.

Preferably, the plurality of process means comprises process information specification means for setting desirable process information. The process information includes first through third process titles, with the first process title indicating a process of producing an overlapping area between two image parts, the second process title indicating a process of making a margin of a predetermined width around a contour of an image part, and the third process title indicating a process of printing a black character over a background.

The apparatus further comprises picture image scanning means for scanning at least one picture image in an original to capture picture data; linework image scanning means for scanning at least one linework to capture linework data; and layout data input means for tracing a line in a mechanical layout sheet to input the page layout data.

Alternatively, the apparatus further comprises icon display means for displaying each of the plurality of page numbers as an icon, wherein the page number specification means further comprises icon movement monitoring means for monitoring a movement of the icon moved by operator.

The present invention is also directed to a reproduction process apparatus for executing a variety of reproduction-related processes, and includes a memory for storing page construction data including page layout data and image part data, the page layout data representing positions of a plurality of image parts laid on one page and the image part data representing the plurality of image parts. Also included is a working memory for storing data used in execution of each of the variety of reproduction-related processes, a hierarchical memory for storing first hierarchy data including a plurality of job names each representing a print, second hierarchy data including a plurality of page numbers, and third hierarchy data including a plurality of names of the page construction data. Each of the plurality of job names has at least one page number as the second hierarchy data, each of the plurality of page numbers has at least one name of the page construction data as the third hierarchy data. Job name specification means are provided for selecting a specific job name out of the plurality of job names, and data transfer means are provided for comparing the specific job name with the first hierarchy data to extract all names of the page construction data corresponding to the specific job name from the second hierarchy data, and the third hierarchy data, and transferring the page construction data specified by the all names of the page construction data from the memory to the working memory.

In a preferred embodiment, the apparatus is further comprised of a plurality of process means for individually executing the variety of reproduction-related processes; process specification means for specifying a certain process; and selection means for selecting specific process means for executing the certain process out of the plurality of process means and activating the specific process means to execute the certain process according to data stored in the working memory.

Preferably, the plurality of process means comprises process information specification means for setting desirable process information, the process information including first through third process titles, with the first process title indicating a process of producing an overlapping area between two image parts, the second process title indicating a process of making a margin of a predetermined width around a contour of an image part, and the third process title indicating a process of printing a black character over a background.

Moreover, the apparatus is comprised of a pattern memory for storing a signature pattern representing a page signature pattern on each printing plate. The plurality of process means comprise output means for outputting the page construction data according to signature data, and the output means further comprises signature data layout means for allocating the page construction data corresponding to the all names transferred to the working memory to the signature data for each page according to the signature pattern.

According to another aspect of the present invention, the apparatus further comprises picture image scanning means for scanning at least one picture image in an original to capture picture data, linework image scanning means for scanning at least one linework to capture linework data, and layout data input means for tracing a line in a mechanical layout sheet to input the page layout data.

According to still another aspect of the present invention, the apparatus further comprises icon display means for displaying each of the plurality of job names as an icon, wherein the job name specification means further comprises icon movement monitoring means for monitoring movement of an icon moved by the operator.

The present invention is also directed to a method of executing a variety of reproduction-related processes, the method comprising the steps of (a) storing page construction data including page layout data and image part data, the page layout data representing positions of a plurality of image parts laid on one page, and the image part data representing the plurality of image parts; (b) preparing a working memory for storing data used in execution of each of the variety of reproduction-related processes; (c) storing first hierarchy data including a plurality of job names each representing a print, second hierarchy data including a plurality of page numbers, and third hierarchy data including a plurality of names of the page construction data, with each of the plurality of job names having at least one page number as the second hierarchy data, and each of the plurality of page numbers having at least one name of the page construction data as the third hierarchy data; (d) selecting a specific page number out of the plurality of page numbers; and (e) comparing the specific page number with the second hierarchy data to extract at least one name of the page construction data corresponding to the specific page number from the third hierarchy data, and transferring the page construction data specified by the at least one name of the page construction data to the working memory.

The present invention is also directed to a method of executing a variety of reproduction-related processes, the method comprising the steps of: (a) storing page construction data including page layout data and image part data, with the page layout data representing positions of a plurality of image parts laid on one page, and the image part data representing the plurality of image parts; (b) preparing a working memory for storing data used in execution of each of the variety of reproduction-related processes; (c) storing first hierarchy data including a plurality of job names each representing a print, second hierarchy data including a plurality of page numbers, and third hierarchy data including a plurality of names of the page construction data, with each of the plurality of job names having at least one page number as the second hierarchy data, and each of the plurality of page numbers having at least one name of the page construction data as the third hierarchy data; (d) selecting a specific job name out of the plurality of job names; and (e) comparing the specific job name with the first hierarchy data to extract all names of the page construction data corresponding to the specific job name from the second hierarchy data and the third hierarchy data, and transferring the page construction data specified by the all names of the page construction data to the working memory.

BRIEF DESCRIPTION OF THE DRAWINGS

These and other objects, features, aspects, and advantages of the present invention will become more apparent from the following detailed description of the preferred embodiment illustrated in the accompanying drawings in which:

FIGS. 19A through 19C are diagrams illustrating process information, "Trapping", "Outline", and "Overprinting", respectively;

DESCRIPTION OF THE PREFERRED EMBODIMENT

Figure 1:
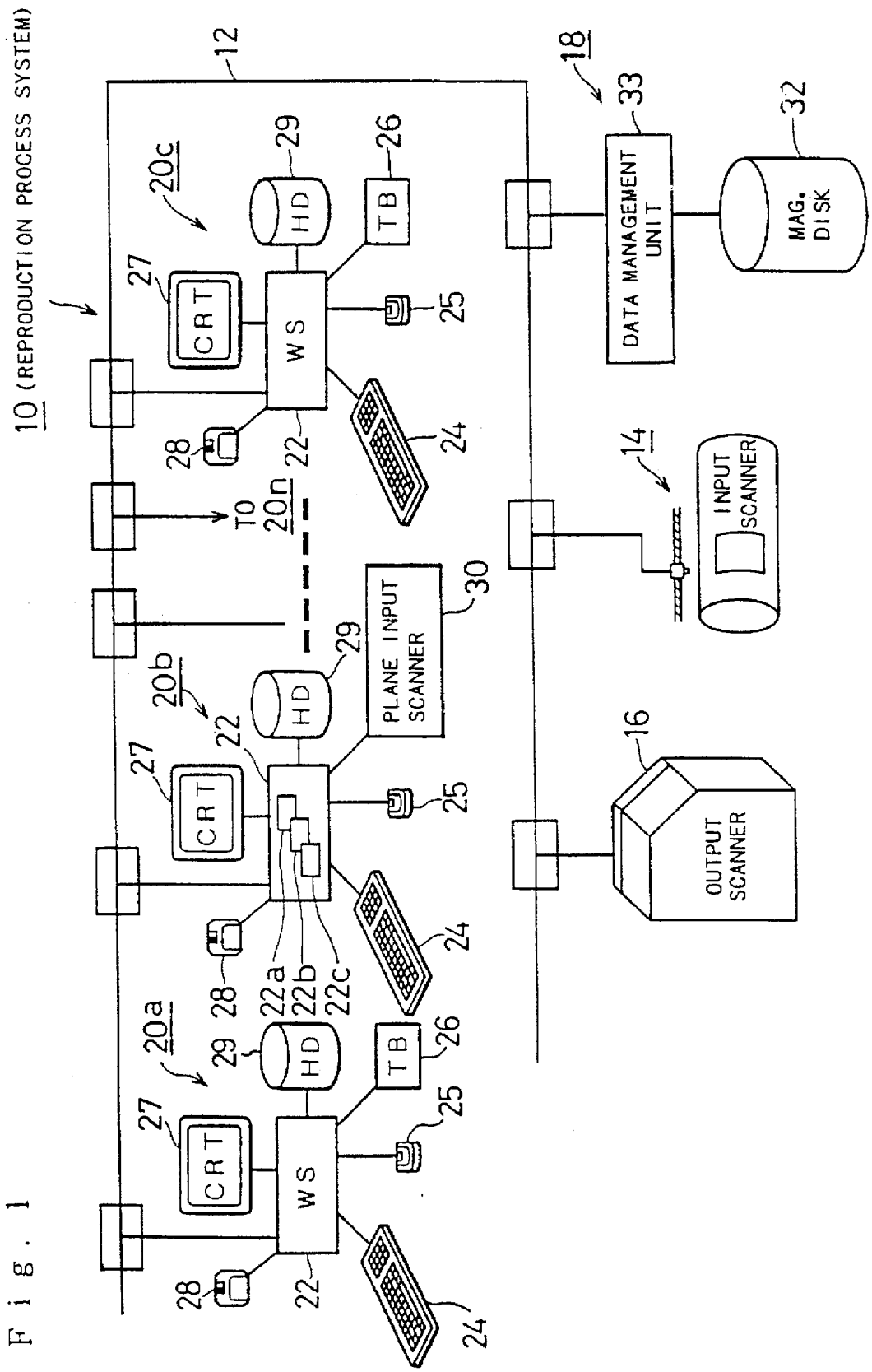
FIG. 1 is a schematic view illustrating a reproduction process system 10 embodying the instant invention.

Reproduction process system 10 (FIG. 1) is constituted as a local area network (hereinafter referred to as LAN) and includes input scanner 14 for scanning image data of a photographic original, output scanner 16 for recording a final composite image on a photosensitive film, data management device 18 for storing and managing a variety of data, and a plurality of reproduction process terminals 20a through 20n, which are connected with one another via a transmitting channel 12. A typical example of the LAN used here is Ethernet (registered trade mark owned by Xerox). Although only first through third reproduction process terminals 20a through 20c are illustrated in FIG. 1, the reproduction process system 10 may include any number of reproduction process terminals.

Each of the reproduction process terminals 20a through 20c includes a work station 22 as a central constituent and a plurality of peripheral units including a keyboard 24, a mouse 25, a tablet 26, a color CRT (cathode ray tube) display 27, a flexible disk drive 28, and a hard disk unit 29. Each work station 22 (see terminal 20b) is constructed of a micro-computer including a CPU (central processing unit) 22a, a ROM (read only memory) 22b, and a RAM (random access memory) 22c. The second reproduction process terminal 20b includes a plane input scanner 30 in place of the tablet 26.

The data management device 18 includes a magnetic disk unit 32 for storing a variety of data including picture data, linework data, and page layout data and a data management unit 33 for managing input and output of data in and from the magnetic disk unit 32. The data management unit 33 manages and stores picture data input through scanning, with the input scanner 14, a variety of data generated with the reproduction process terminals 20a through 20c and stored in the magnetic disk unit 32.

Figure 2:
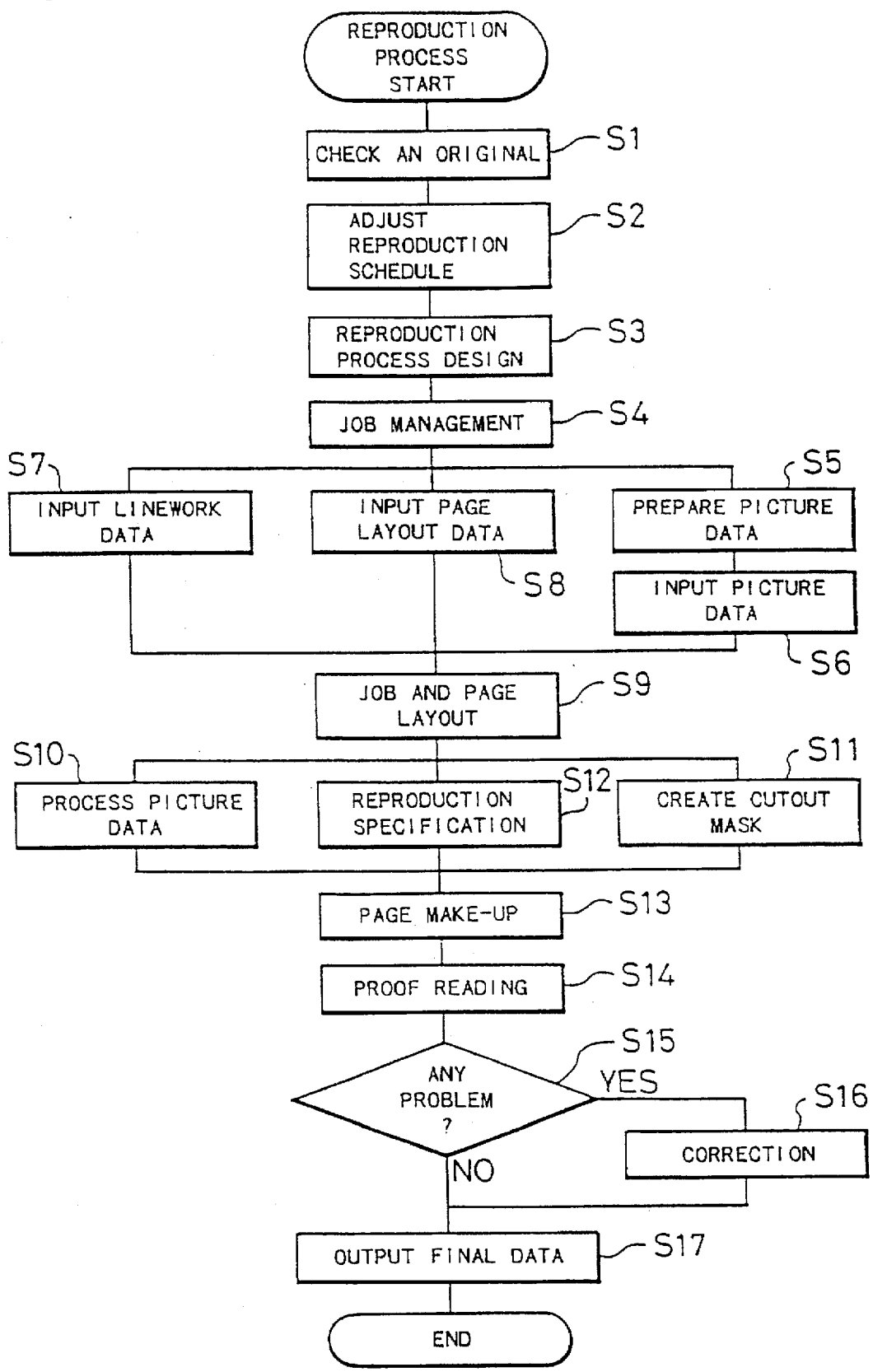
FIG. 2 is a flowchart showing a series of reproduction-related processes executed by the reproduction process system 10.

A series of reproduction-related processes executed by the reproduction process system 10 of FIG. 1 are described according to the flowchart of FIG. 2. At steps S1 through S3, original checking, reproduction schedule adjustment, and reproduction process design are executed manually. At step S1, the operator checks an original and a layout sheet previously prepared as well as a process specification. At step S2, the operator checks a due date for reproduction process and adjusts a reproduction schedule accordingly. At step S3, the operator grasps contents of each reproduction process and makes detailed work instructions according to the reproduction schedule.

At step S4, a process manager supervising work for the entire reproduction process performs job management which includes electronic processing of information representing contents of reproduction (for example, a job name, a page number, and a signature pattern) and a due date determined at steps S1 through S3. The job management process of step S4 allows effective work control in a reproduction-related process so as to simplify operation required for each process worker. Details of the job management process executed at step S4 will be described later.

Input operations conducted for subsequent reproduction processes are described according to steps S5 through S8. In a picture preparation process executed at step S5, a picture image included in a photographic original is prepared, and required input conditions, such as magnification and input angle, are determined. In a picture input process at step S6, the picture image in the photographic original is scanned with input scanner 14. In a linework input process at step S7, a linework image including letters or illustrations is scanned by the second reproduction process terminal 20b, using plane input scanner 30. Picture data and linework data thus input are stored in the magnetic disk unit 32 of the data management device 18. In a page layout input process at step S8, contents specified in a mechanical form are traced and inputted by the first reproduction process terminal 20a using tablet 26, as page layout data. The page layout data thus generated is stored in the magnetic disk unit 32 of the data management device 18.

Figure 3:
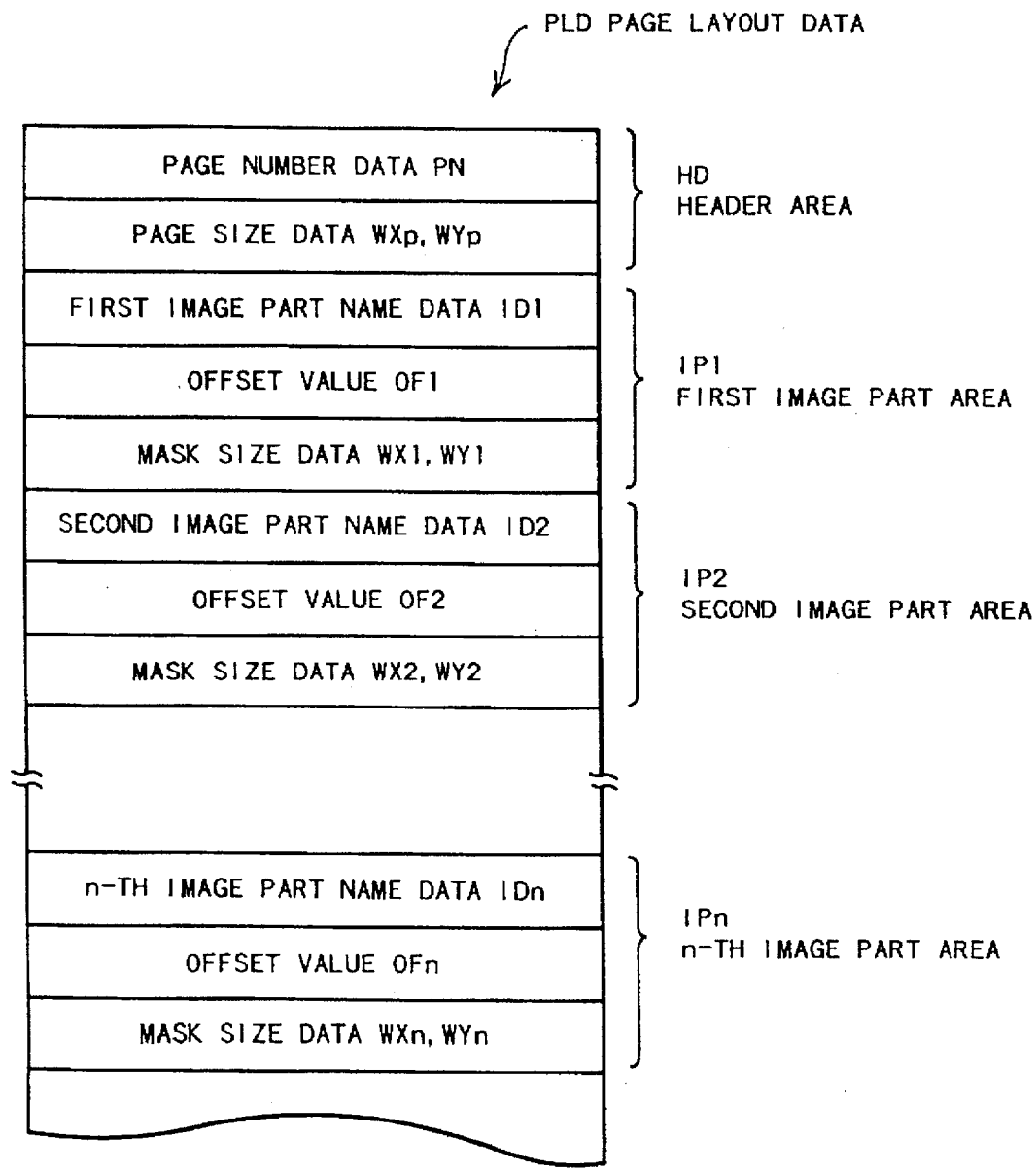
FIG. 3 conceptually shows a structure of page layout data PLD.

The page layout data represents positions of image parts including picture data and linework data in one page. FIG. 3 illustrates conceptually a structure of page layout data PLD that corresponds to a certain page that includes a header area HD and a plurality of image part areas IP1, IP2, ..., IPn (n: arbitrary integer) corresponding to image parts mounted on the certain page. The header area HD further includes page number data PN and page size data WXp and WYp. The respective image part areas IP1, IP2, ..., IPn include image part name data ID1 through IDn each showing identification of an image part mounted on the certain page, off-set values OF1 through OFn each showing a position of a mask area on the certain page, and mask size data WX1 through WXn, WY1 through WYn each representing dimensions of a mask area.

Figure 4:
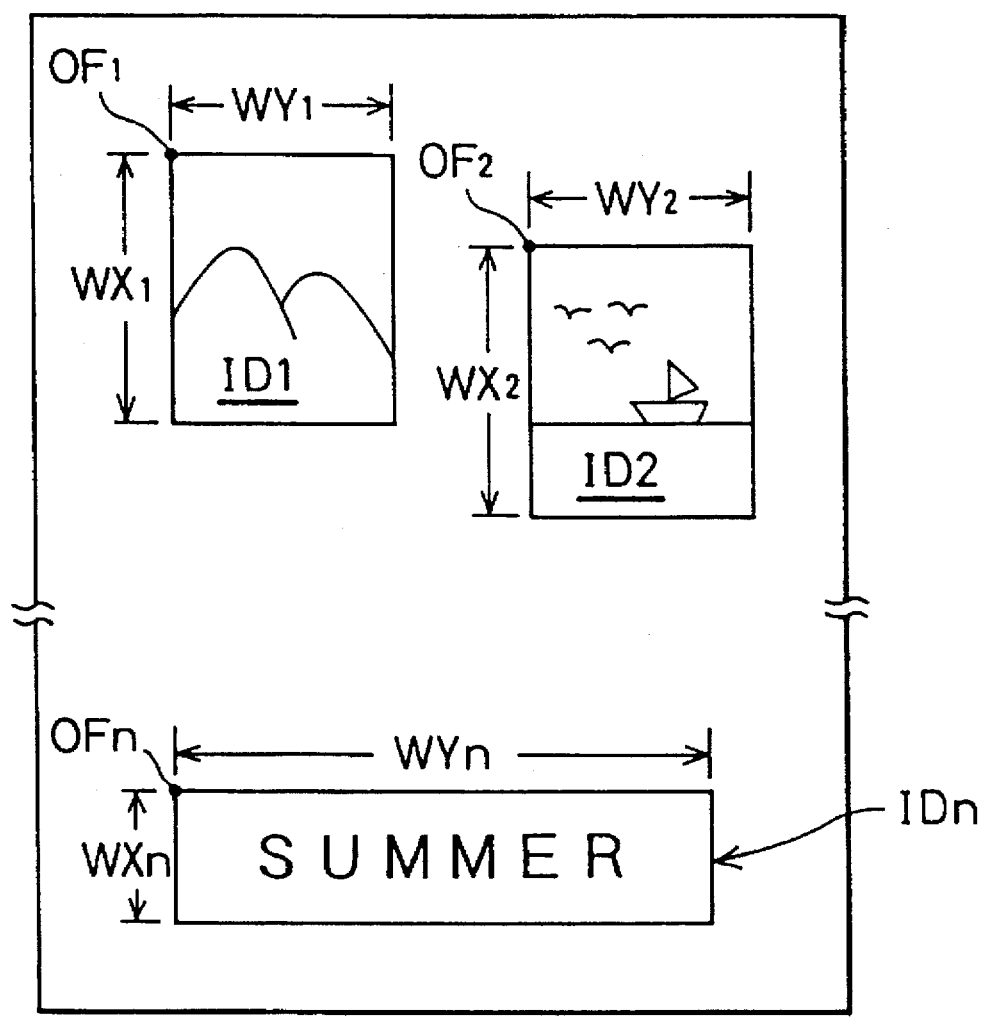
FIG. 4 shows a page image corresponding to the page layout data of FIG. 3.

FIG. 4 shows a page image corresponding to the page layout data PLD of FIG. 3. A picture of a first image part ID1 representing a mountain is allocated to a first mask area defined by a first off-set value OF1 and first mask size data WX1, WY1 while another picture of a second image part ID2 representing the sea is allocated to a second mask area defined by a second off-set value OF2 and second mask size data WX2, WY2. Linework of an n-th image part IDn representing a series of letters "SUMMER" is further allocated to an n-th mask area defined by an n-th off-set value OFn and n-th mask size data WXn, WYn.

At step S9, the process manager lays out picture data, linework data, and page layout data stored in the magnetic disk unit 32 on a certain page corresponding to the page number specified by the job management process of step S4 with any one of the reproduction process terminals 20a through 20c. The job and page layout process of step S9 allows effective data management in reproduction-related processes so as to simplify operations required for each process worker. Details of the layout process executed at step S9 will be described later.

Steps S10 through S17 described below are conducted by each process worker in the reproduction-related process.

In picture processing at step S10 and creation of a cutout mask at step S11, a list of picture data or page layout data is displayed on the color CRT display 27 by specifying the job name and the page number with any one of the reproduction process terminals 20a through 20c. The list of picture data shows a file name of each data. When a process worker specifies a desired picture image in the list of picture data, the desired picture image is enlarged and displayed on the color CRT display 27. The process worker conducts retouching and cutout of the desired picture image displayed. A list of picture data or page layout data is displayed on the color CRT display 27 only by specifying the job name and the page number since page layout data, picture data and linework data are allocated to each job and page at step S9. In an alternative structure, arbitrary picture data is directly input from the magnetic disk unit 32 without specification of the job name and the page number.

In the reproduction specification process executed at step S12, page construction data including page layout data, picture data, and linework data are displayed on the color CRT display 27 by specifying the job name and the page number with any one of the reproduction process terminals 20a through 20c, and the process worker allocates process information such as "Trapping", "Outline", or "Overprinting" to image part data in the designated page through interaction with the CRT display 27. In an alternative structure, process information is allocated to arbitrary picture data directly input from the magnetic disk unit 32. Details of the reproduction specification process at step S12 will be described later.

In a page make-up process at step S13, page layout data, picture data, and linework data are composed for page make-up. In a proof-reading process at step S14, layout and colors are checked according to the assembled composite data. The program then goes to step S15 at which it is determined whether no problem is found as a result of proof-reading. If the proof-reading indicates some correction is required, the program goes to step S16 at which the reproduction process is returned for correction to the step where an error is made.

When the proof-reading indicates no correction at step S15 or after completion of the correction at step S16, the program proceeds to step S17 at which final composite data is output to the output scanner 16, so that a resultant image is recorded on a photosensitive film. After completion of the series of reproduction process steps, the program exits from the routine. Details of the final data output at step S17 will be described later.

Figure 5:
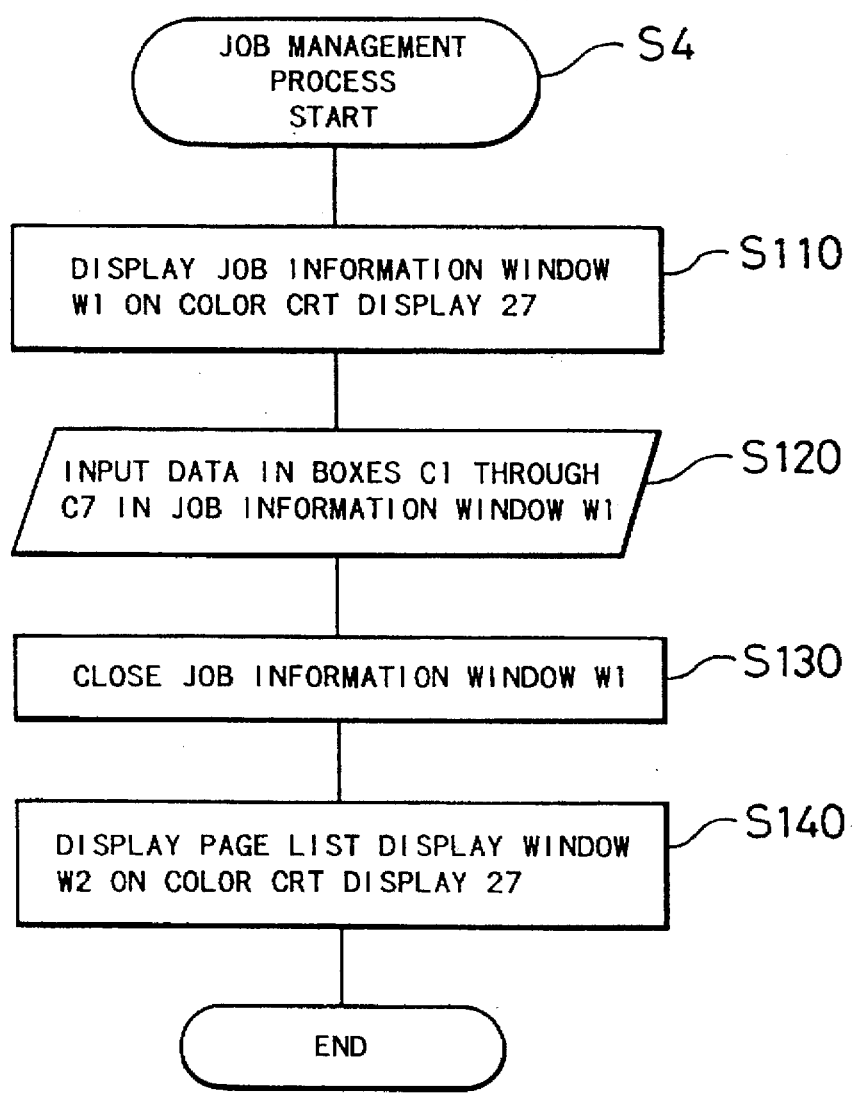
FIG. 5 is a flowchart showing details of the job management process of step S4 in the flowchart of FIG. 2 executed by any one of reproduction process terminals 20a through 20n.
Figure 6:
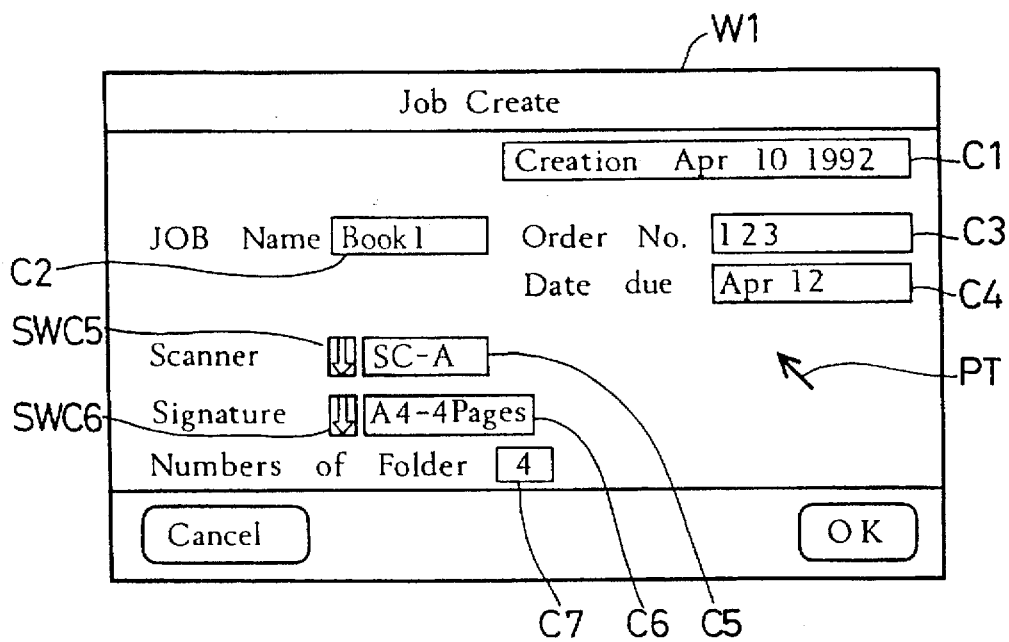
FIG. 6 shows a job information window W1.

Details of the job management process at step S4 are described according to the flowchart of FIG. 5. Step S4 is executed with any one of the reproduction process terminals 20a through 20c. The CPU 22a of an arbitrary reproduction process terminal executes the following process in response to selection by the process manager. At step S110, the CPU 22a displays a job information window W1 having a title of "Job Create" (see FIG. 6) on a screen of the color CRT display 27 (hereinafter referred to as CRT screen). The job information window W1 includes a date-of-creation box C1, a job name box C2, an order number box C3, a date-of-completion box C4, an output scanner identification box C5, a signature pattern box C6, and a number of folders box C7.

The program then goes to step S120 at which data are input into the boxes C1 through C7 of the job information window W1 displayed on the CRT screen. Data corresponding to the date-of-creation box C1 is automatically input by a timer unit incorporated in the work station 22. The process manager inputs data for display at job name box C2, order number box C3, and date-of-completion box C4 by operating the mouse 25 to move a pointer PT to the respective boxes C2 through C4 on the CRT screen and inputting required characters through the keyboard 24. The job name written in the job name box C2 specifies a target print of the reproduction process, for example, "Book 1". Contents confirmed at the original check process of step S1 and the schedule adjustment process of step S2 are input into the order number box C3 and the date-of-completion box C4.

Figure 7:
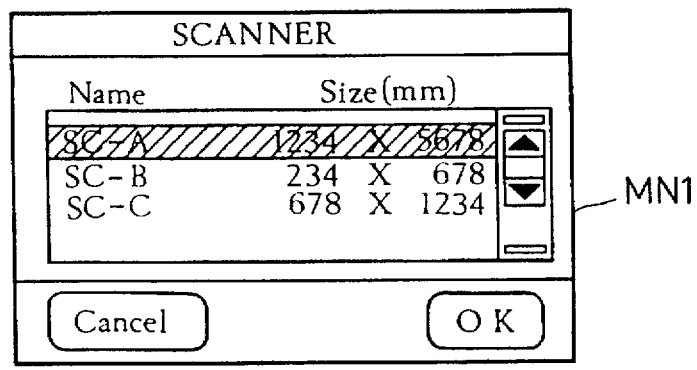
FIG. 7 shows an output scanner identification menu MN1.

Data corresponding to the output scanner identification box C5 is input as described below. The process manager operates the mouse 25 to click a switch SWC5 displayed immediately before the output scanner identification box C5 to open an output scanner identification menu MN1 shown in FIG. 7. The process manager then clicks the mouse 25 to select a name of the output scanner 16 out of a plurality of scanner names displayed in the output scanner identification menu MN1. The process manager may identify the name of the output scanner 16 according to the printing size shown in the output scanner identification menu MN1 instead of selecting a machine type.

Figure 8:
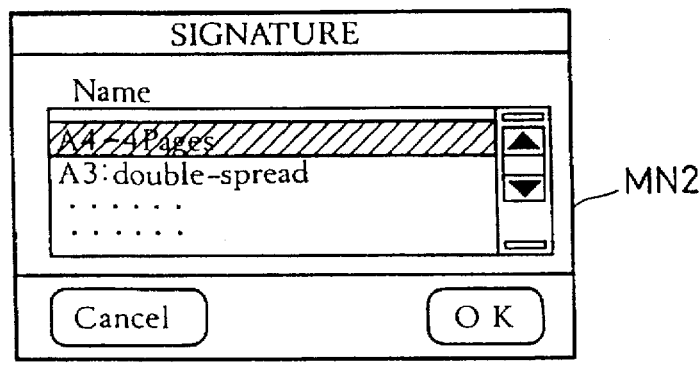
FIG. 8 shows a signature pattern menu MN2.

A page signature pattern on a photosensitive film corresponding to a plate surface is written in the signature pattern box C6 in the following manner. The process manager operates the mouse 25 to click a switch SWC6 displayed immediately before the signature pattern box C6 to open a signature pattern menu MN2 shown in FIG. 8. The process manager then clicks the mouse 25 to select a desirable signature pattern out of a plurality of signature patterns displayed in the signature pattern menu MN2. The signature pattern menu MN2 shown in FIG. 8 includes, for example, a signature pattern expressed as "A4-4Pages", which means that four A4 pages are mounted on a photosensitive film.

Data in the number of folders box C7 represents a folding number (a unit of sheets printed at once) of a print specified by the job name input in the job name box C2. The process manager operates the mouse 25 to move the pointer PT to the number of folders box C7 on the CRT screen and inputs a corresponding figure through the keyboard 24.

Figure 9:
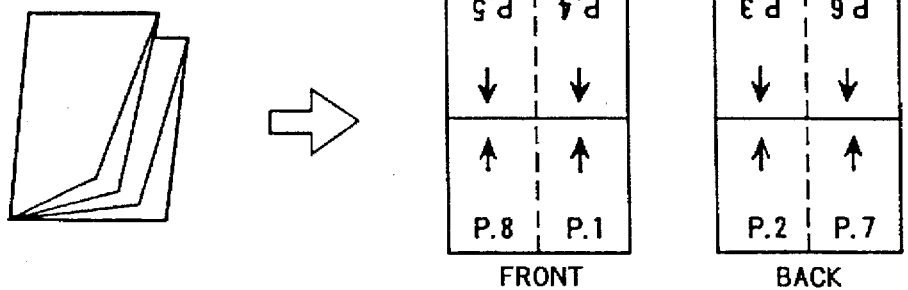
FIG. 9 illustrates a quarto print.
Figure 10:
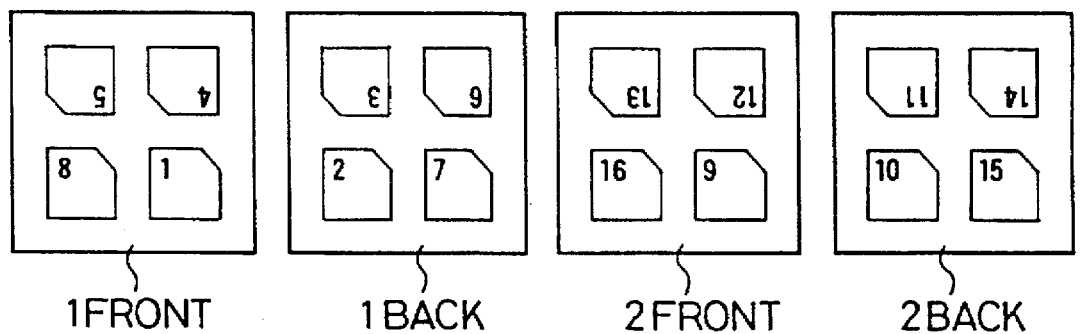
FIG. 10 illustrates a layout of four films.

A recording form on photosensitive films is determined according to a signature pattern input in the signature pattern box C6 and a number of folders written in the number of folders box C7. This process is described hereinafter in detail, based on an example in which the signature pattern is "A4-4 Pages" representing four A4 pages mounted on a photosensitive film, and the number of folders is set equal to four. Four photosensitive films (two front films and two back films) each having four A4 pages mounted thereon form a quarto sixteen-page print as shown in FIG. 9. A sixteen-page print is completed by allocating four A4 pages to each of four films "1FRONT", "1BACK", "2FRONT", and "2BACK" as shown in FIG. 10. Required data are input in the signature pattern box C6 and the number of folders box C7 to realize a desirable recording form.

After data input into the boxes C1 through C7 on the job information window W1 at step S120, the program goes to step S130 at which a click of an "OK" button disposed on the lower portion of the job information window W1 closes the job information window W1.

Figure 11:
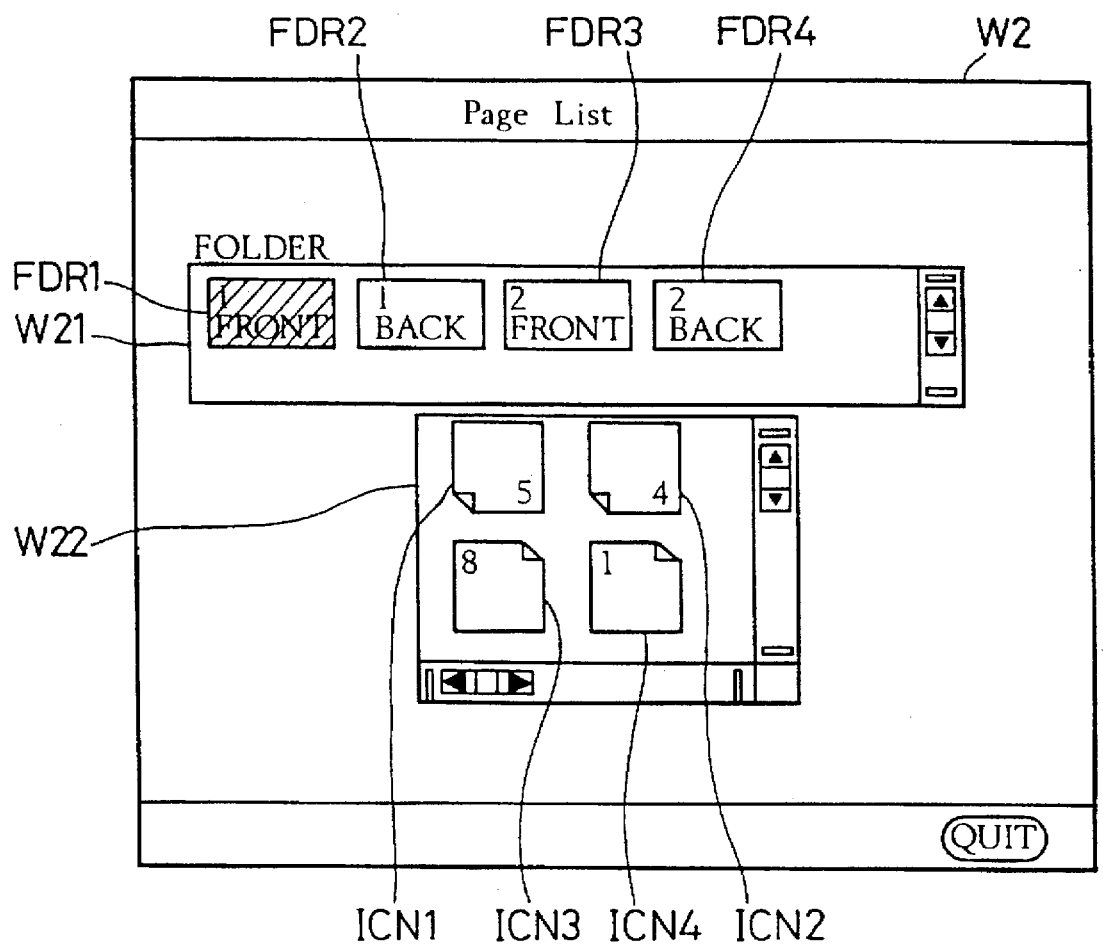
FIG. 11 shows a page list display window W2.

After execution of step S130, the program proceeds to step S140 at which page list display window W2 (FIG. 11) is shown on color CRT display 27. The page list display window W2 schematically shows the recording form of the photosensitive films described above which includes a title "Page List" and first and second sub-windows W21 and W22. The first sub-window W21 shows folders FDR1 through FDR4 corresponding to the number of folders input in the number of folders box C7 of the job information window W1. The second sub-window W22 visually shows a signature pattern input in signature pattern box C6. Each of the folders FDR1 through FDR4 displayed on the folder-display first sub-window W21 corresponds to the signature pattern-display second sub-window W22. When one of the folders FDR1 through FDR4 is selected in the folder-display first sub-window W21, contents in a photosensitive film corresponding to the selected folder FDR1, FDR2, FDR3, or FDR4 are displayed in the signature pattern-display second sub-window W22.

More particularly, when a quarto sixteen-page print is prepared as described above, first through fourth folders FDR1 through FDR4, corresponding to four films "1FRONT", "1BACK", "2FRONT", and "2BACK" shown in FIG. 10, are displayed in the folder-display first sub-window W21. When the first folder FDR1 corresponding to the "1FRONT" film is selected, first through fourth icons ICN1 through ICN4, corresponding to the respective fifth, fourth, eighth, and first pages, are shown in the signature pattern-display second sub-window W22.

Figure 12:
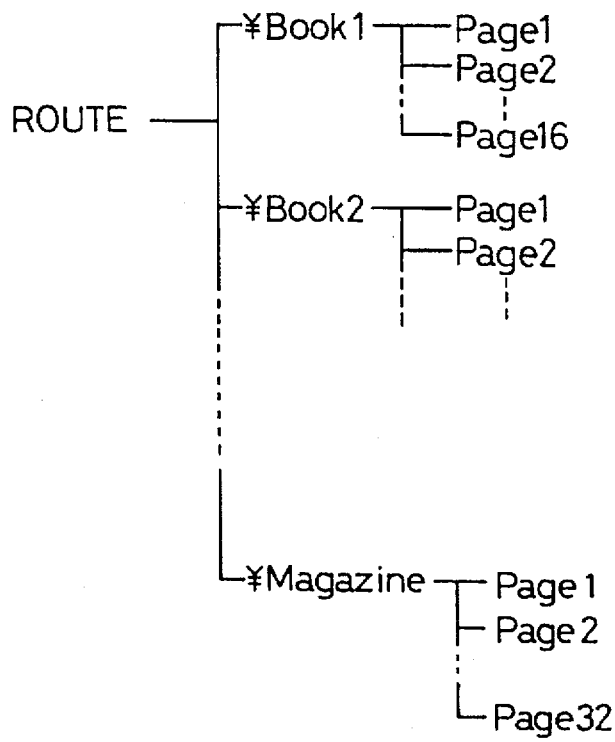
FIG. 12 is a diagram of a directory structure for the magnetic disk unit 32 of FIG. 1 in creation of job information.

A typical structure for data stored in magnetic disk unit 32 is described in detail according to the schematic diagram of FIG. 12. Magnetic disk unit 32 includes a plurality of directories each having a job name input in the job name box C2, for example, "Book 1". Each directory with a job name further includes a plurality of sub-directories each having a number of pages determined according to the signature pattern and the number of folders, for example, "Page 1", "Page 2", ..., "Page 16". The directories with job names are created after data input into the boxes C1 through C7 in the job information window W1 (FIG. 6) at step S120 and closing of the window W1 at step S130. After execution of step S140, the job management process at step S4 of FIG. 2 is concluded.

Figure 13:
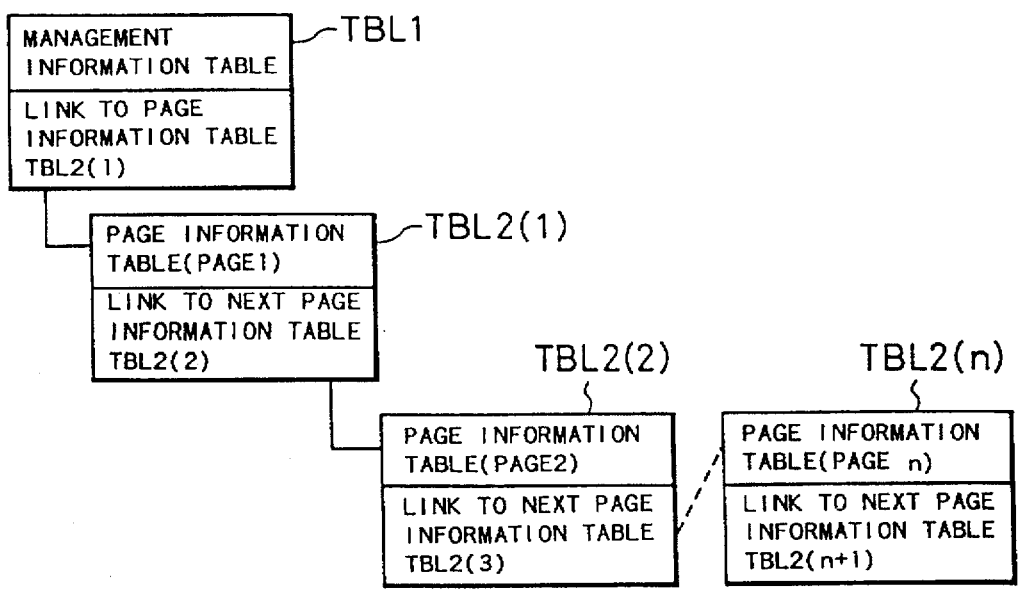
FIG. 13 is a block diagram illustrating the relationship between a management information table TBL1 and a page information table TBL2.

A management information table TBL1 and one or a plurality of page information tables TBL2 shown in FIG. 13 are created through execution of the job management process. The management information table TBL1 includes the date of creation, the job name, the order number, the due date, the name of the output scanner, the signature pattern, and the number of folders. The page information table TBL2 is created for each page and includes data representing the page number, the number of constituents of the page, and the general attribute of the page. The management information table is linked to the plurality of page information tables TBL2 according to a predetermined rule. As shown in FIG. 13, the management information table TBL1 is connected to a first page information table TBL2(1) for the first page, which is further linked to a second page information table TBL2(2) for the second page. In this manner, the management information table TBL1 is successively linked to a plurality of page information tables TBL2(1) through TBL2 (n) (n: arbitrary integer) in this sequence. Since these tables TBL1 and TBL2(1) through TBL2(n) are linked via pointer data, modification of the pointer data readily allows supplement and elimination of a page information table TBL2(k) (k: arbitrary integer). These tables TBL1 and TBL2(1) through TBL2(n) are stored in the magnetic disk unit 32.

As described above, job information is newly set and determined according to the job management routine of FIG. 5. Existing job information may be changed later by selecting a required box from boxes C1 through C7 in job information window W1 and inputting new data in the box.

Figure 14:
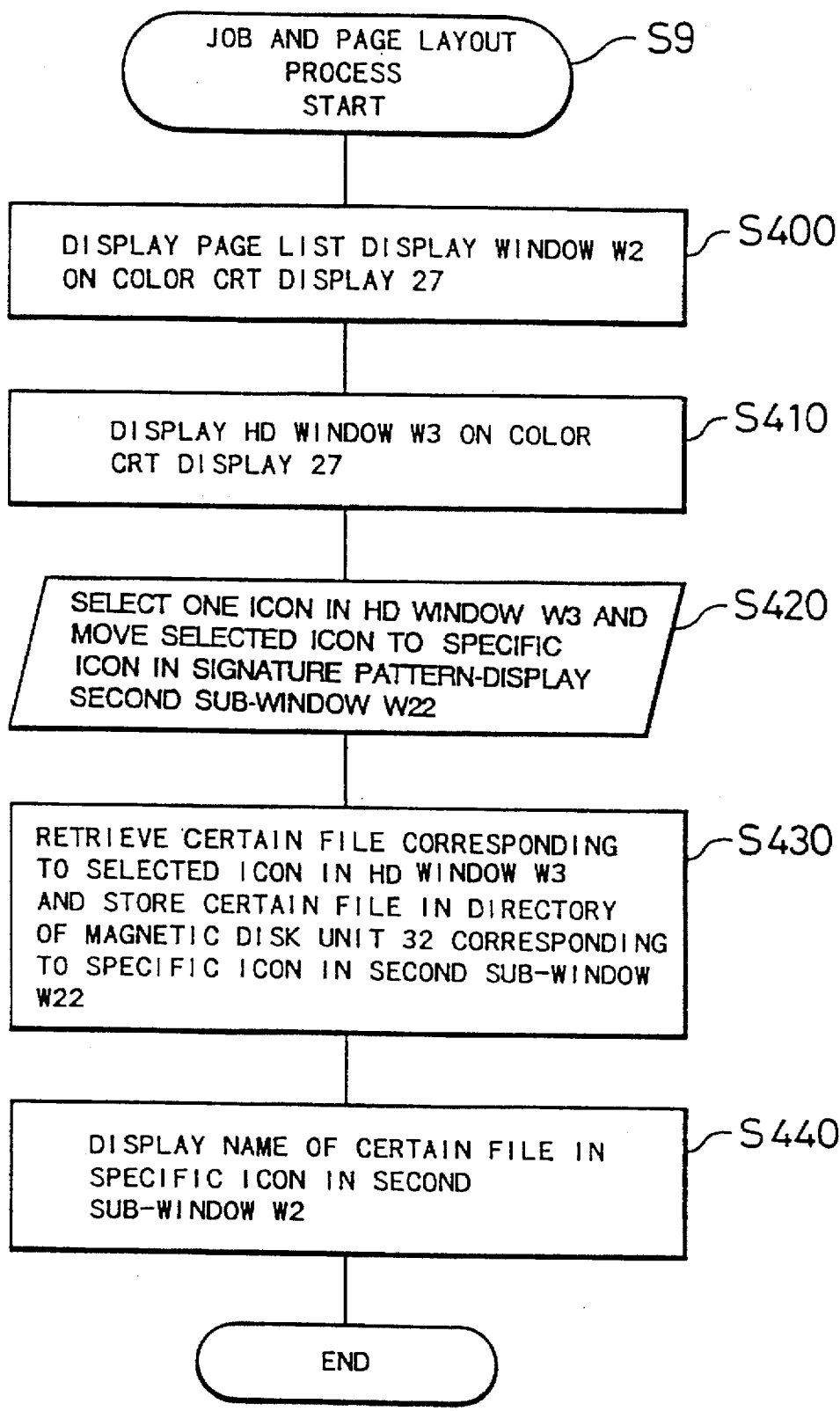
FIG. 14 is a flowchart showing the job and page layout process at step S9 of FIG. 2 executed by any one of the reproduction process terminals 20a through 20n.

Details of the job and page layout routine executed at step S9 of FIG. 2 are described according to the flowchart of FIG. 14.

Figure 15:
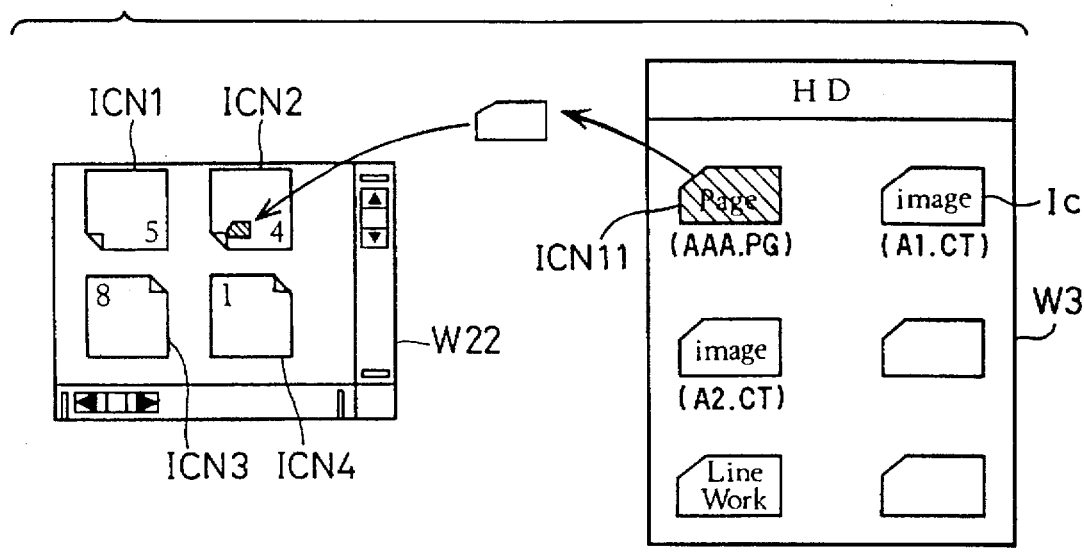
FIG. 15 is a diagram illustrating an exemplified process of setting page layout data in a HD window W3 to one of the icons ICN1 through ICN4 in the signature pattern-display second sub-window W22.

At step S9, required working data are extracted from the picture data, the linework data, and the page layout data previously stored in the magnetic disk unit 32 through execution of the picture input process of step S6, the linework input process of step S7, and the page layout input process of step S8, and allocated to the job and the page previously determined through execution of the job management process of step S4. The process at step S9 is executed by any one of the reproduction process terminals 20a through 20c and includes the steps shown in the flowchart of FIG. 14. At step S400, the page list display window W2 (FIG. 11) is displayed on the color CRT display 27. The signature pattern-display second sub-window W22 of the page list display window W2 includes the first through fourth icons ICN1 through ICN4 corresponding to the folder selected by the process manager. An HD window W3 shown in FIG. 15 is then displayed on the color CRT display 27 at step S410. The HD window W3 includes a plurality of icons representing the page layout data, the picture data, and the linework data stored in the magnetic disk unit 32 and output by the data management unit 33. In the HD window W3, each icon, for example, ICN11 or ICN12, includes data type information to discriminate picture data, linework data, and page layout data from one another.

At step S420, working data is allocated to a target page in response to operation of the mouse 25 by the process manager who operates the mouse 25 to move the pointer PT to a desirable icon out of the icons ICN11, ICN12, ..., and ICN1n in the HD window W3 on the CRT screen and select the desirable icon by a click of the mouse 25. The process manager then moves the desirable icon to a target icon representing the target page in the signature pattern-display second sub-window W22. In the example of FIG. 15, the first icon ICN11 representing a file of page layout data (file name=AAA.PG) in the HD window W3 is moved to the second icon ICN2 corresponding to the fourth page in the signature pattern-display second sub-window W22. When a file of page layout data is specified in the HD window W3, required picture data and linework data may be previously set in the selected page layout data. In this case, specification of picture data and linework data is not required separately.

At step S430, data in a file corresponding to the desirable icon in the HD window W3 specified at step S420 are retrieved and moved to a sub-directory in the magnetic disk unit 32, which corresponds to the target icon specified in the signature pattern-display second sub-window W22. After execution of step S420 for the example shown in FIG. 15, the directory structure in the magnetic disk unit 32 is changed from that shown in FIG. 12 to that shown in FIG. 16. In this example shown in FIG. 16, the file AAA.PG of page layout data is stored in a page number sub-directory "Page 4" corresponding to the fourth page in a job-name directory "Book 1". Picture data A1.CT and A2.CT previously set in the page layout data file AAA.PG are simultaneously stored in the sub-directory "Page 4". When linework data is set in the page layout data file AAA.PG, the sub-directory "Page 4" also stores the linework data (not shown in FIG. 16).

Figure 17:
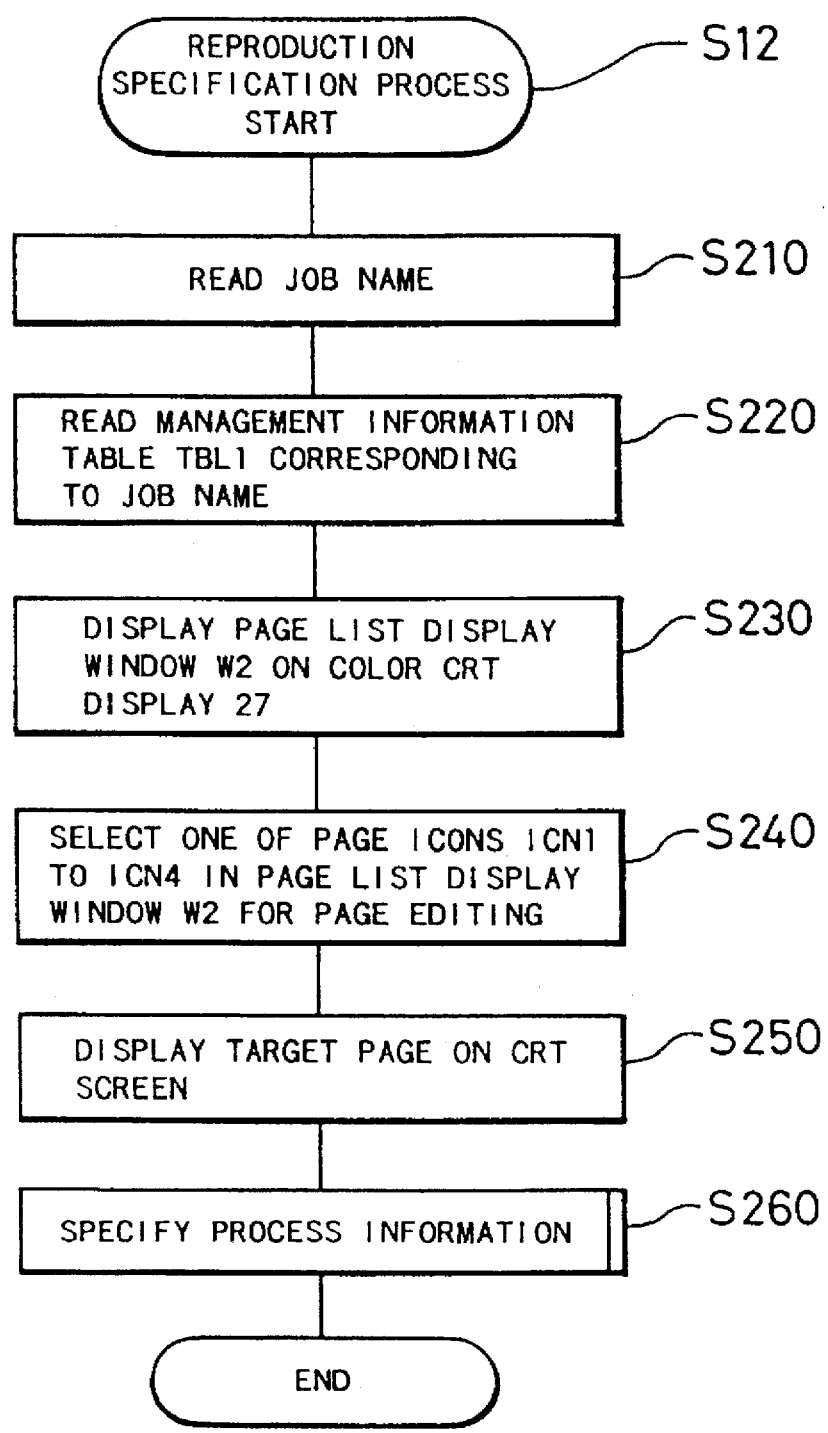
FIG. 17 is a flowchart showing the reproduction specification process at step S12 of FIG. 2 executed by any one of the reproduction process terminals 20a through 20n.

After execution of step S430, the program goes to step S440 at which the name of the specified data file is displayed on the target icon in the signature pattern-display second sub-window W22. After checking allocation of the specified data file to the target page, the layout process at step S9 is concluded. Details of the reproduction specification process executed at step S12 of FIG. 2 with any one of the reproduction process terminals 20a through 20c are described according to the flowchart of FIG. 17.

Figure 18:
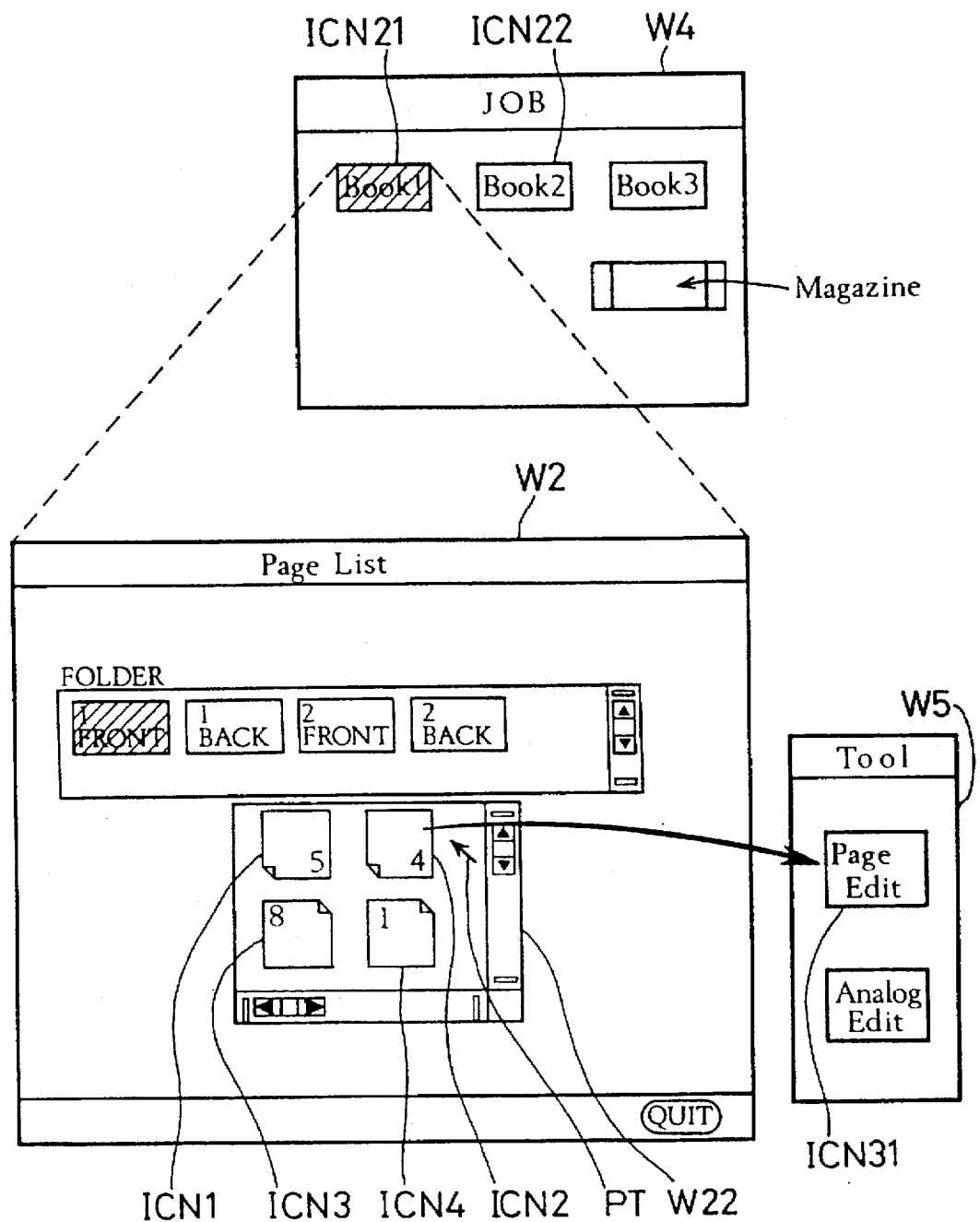
FIG. 18 illustrates a CRT screen in the middle of execution of the reproduction specification process of step S12.

The process worker operates the reproduction process system to display a JOB window W4 (FIGS. 18 and 21) showing contents in a first hierarchy, that is, a plurality of job-name directories stored in the magnetic disk unit 32 on the CRT screen. In the JOB window W4, each job name is shown corresponding to an icon ICN21, ICN22, ..., or ICN2n (n: arbitrary integer). The process worker then selects one of the icons ICN21, ICN22, ..., ICN2n in the JOB window W4. In response to selection of one icon by the process worker, a specific job name corresponding to the selected icon, for example, ICN21, is read at step S210.

At step S220, a management information table TBL1 and page information tables TBL2 corresponding to the specific job name are read from magnetic disk unit 32. The program then goes to step S230 at which a page list display window W2 is displayed on the color CRT display 27 based on the management information table TBL1 and the page information tables TBL2 as shown in FIG. 13.

At step S240, one of page icons ICN1 through ICN4 in a signature pattern-display second sub-window W22 of the page list display window W2 is selected for page editing. The processing at step S240 is executed in response to operation of the mouse 25 by the process worker. The process worker operates the mouse 25 to move the pointer PT to a desirable icon corresponding to a target page for reproduction specification out of the page icons ICN1 through ICN4 in the second sub-window W22 on the CRT screen and selects the desirable icon, for example, ICN2, by a click of the mouse 25. The process worker then moves the selected page icon ICN2 to an icon ICN31 representing page editing in a tool window W5 (FIG. 18) that includes a plurality of tools. Page editing is thus specified for the target page.

At step S250, the target page selected at step S240 is displayed on the CRT screen. That is, a page number sub-directory is extracted from a plurality of sub-directories in the magnetic disk unit 32 (see FIG. 16) based on the job name read at step S210 and the page number selected at step S240. Page layout data and image data stored in the sub-directory are then read out, and the target page corresponding to the page layout data is displayed on the CRT screen.

The program then goes to step S260 at which process information such as "Trapping", "Outline", or "Overprinting" is set for a specific image part in the target page. The "Trapping" process (FIG. 19(a)) expands an overlapped area IP3 between two image parts IP1 and IP2 respectively including one or a plurality of pictures, characters, or the like. Outline (FIG. 19(b)) makes a certain width of margin IP12 around a character or picture contour of an image part IP11. The "Overprinting" process (FIG. 19(c)) overlays black characters IP21 upon a background color UD. Specification of such process information is executed in response to operation of the mouse 25 by the process worker. After specification of process information, the reproduction specification process of step S12 is concluded.

Figure 20:
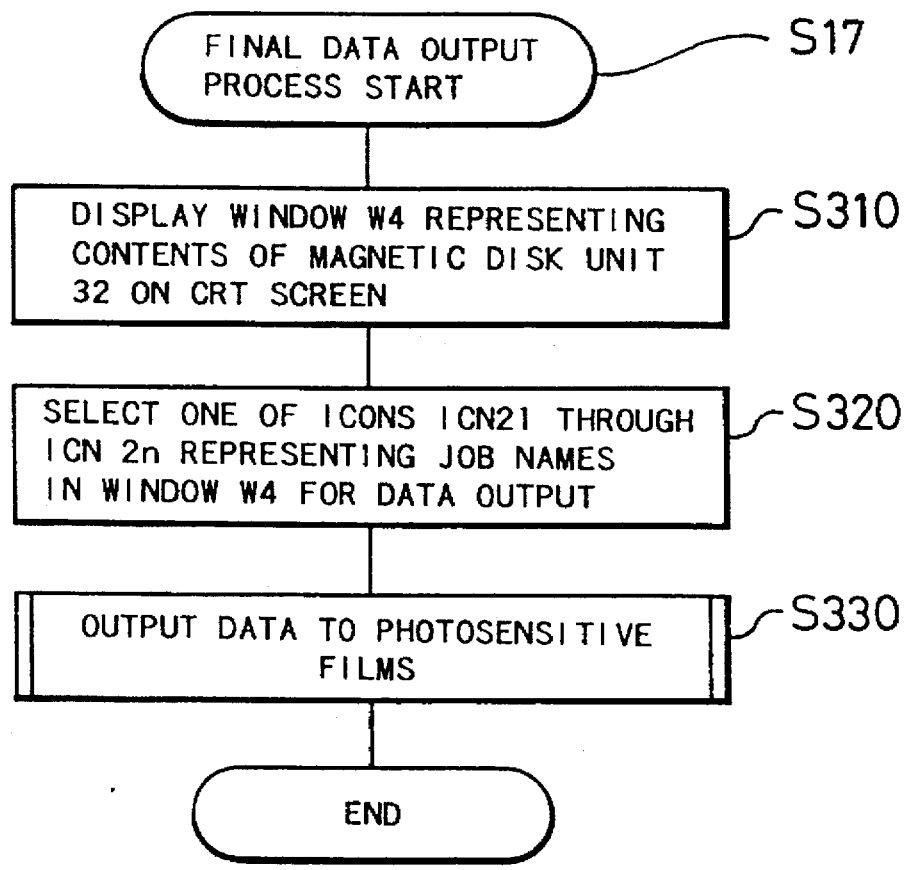
FIG. 20 is a flowchart showing the final data output process at step S17 of FIG. 2 executed by any one of the reproduction process terminals 20a through 20n.

Details of the final data output process executed at step S17 of FIG. 2 with any one of the reproduction process terminals 20a through 20c are described according to the flowchart of FIG. 20.

Figure 21:
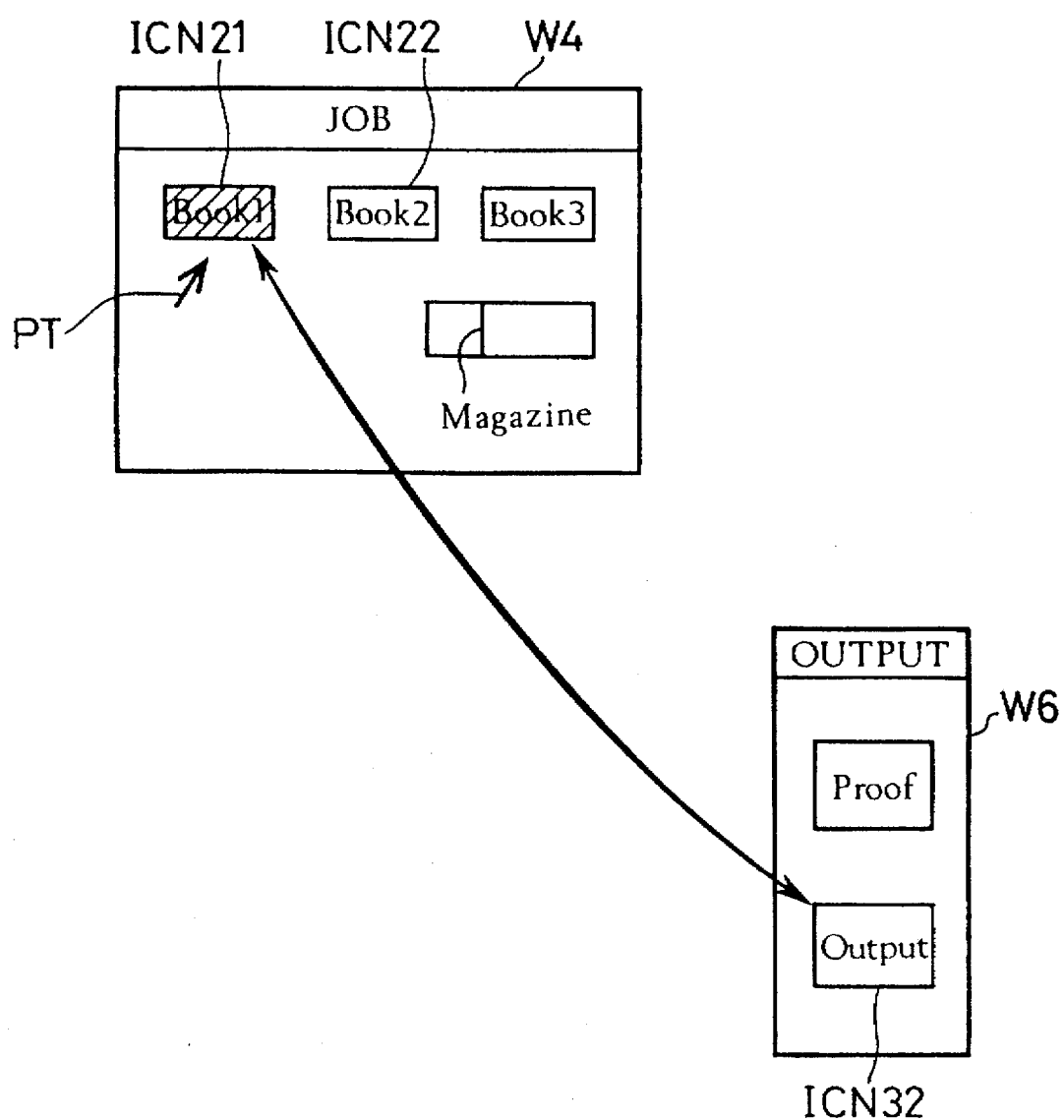
FIG. 21 illustrates a CRT screen after execution of the final data output process of step S17.

At step S310, the JOB window W4 showing contents of the magnetic disk unit 32 is displayed on the CRT screen as shown in FIG. 21. A specific icon, for example, ICN21, is selected out of the icons ICN21 through ICN2n each corresponding to a job name in the JOB window W4, and data under a job name corresponding to the specific icon ICN21 are then specified for the outputting process. The processing at step S320 is executed in response to operation of the mouse 25 by the process worker. The process worker operates the mouse 25 to move the pointer PT to a specific icon corresponding to a desirable job name out of the icons ICN21 through ICN2n in the JOB window W4 on the CRT screen and select the specific icon, for example, ICN21, by a click of the mouse 25. The process worker then moves the selected icon ICN21 to an icon ICN32 representing data output in an output window W6 as shown in FIG. 21. The output window W6 includes a plurality of output-related instructions. Output of data under the desirable job name is thus specified.

At step S330, target pages of data specified by the desirable job name are recorded on photosensitive films. More concretely, a job name directory is extracted from a plurality of directories in the magnetic disk unit 32 (see FIG. 16) based on the job name specified at step S320. Page layout data and image data of each page stored in the directory are then read out, and the target pages corresponding to the page layout data are output to the output scanner 16. In the example of FIG. 21, all pages under the job name "Book 1" are recorded on the photosensitive films. In the job name "Book 1", each plate Y (yellow), M (magenta), C (cyan), or K (black) consists of four photosensitive films as described above, and thereby data corresponding to the total of 16 (=4×4) photosensitive films are output at step S330.

Page layout on each photosensitive film is previously set as a signature pattern at the job management process of step S4 of FIG. 2. Page layout data, picture data, and linework data for all the target pages are thus allocated and output to the photosensitive films based on the signature pattern. After execution of step S330, the final data output process of step S17 is concluded.

Figure 16:
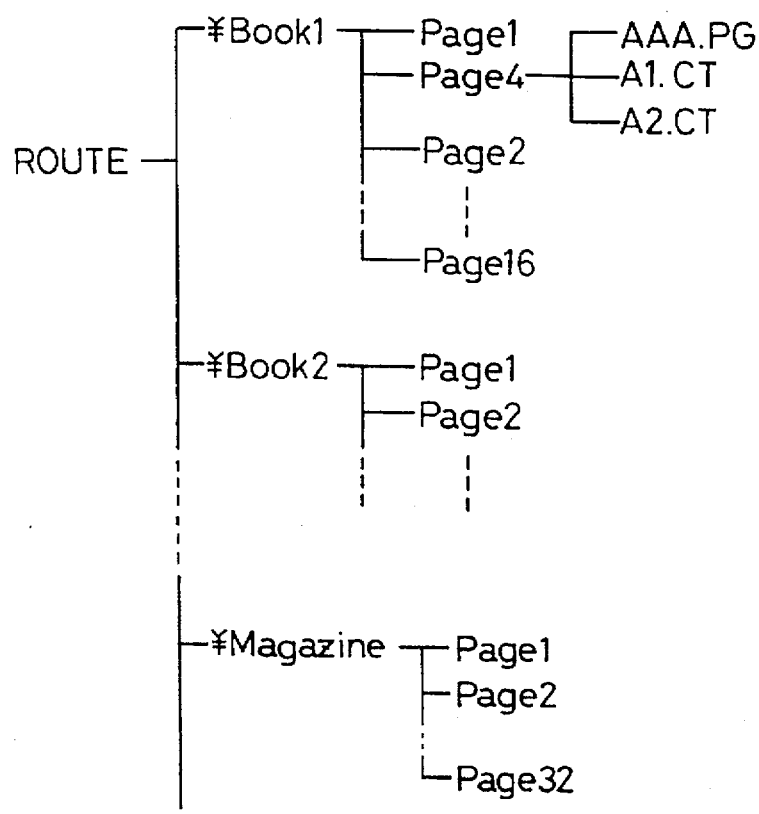
FIG. 16 is a diagram of a directory structure for the magnetic disk unit 32 after execution of the process shown in FIG. 15 for setting page layout data.

As described above, in the reproduction process system 10 of the embodiment, the magnetic disk unit 32 includes a plurality of job name directories, for example, "¥Book 1", "¥Book 2", and "¥Magazine", each having a plurality of page name sub-directories, for example, "Page 1", "Page 2", as shown in FIG. 16. Each page number sub-directory stores page layout data, for example, AAA.PG representing a page structure specified by the page number and picture data and/or linework data, for example, A1.CT and A2.CT.

When the process worker specifies a job name and a page number, a target page corresponding to page layout data in a page number sub-directory determined by the job name and the page number is automatically displayed on the CRT screen. This frees the process worker from making troublesome selection and specification of page structure data including picture data, linework data, and page layout data, thus improving the working efficiency.

In the final data output process of step S17, when the process worker specifies a desirable job name, page layout data, picture data, and linework data hierarchically contained under the job name are automatically read out. In the system of the embodiment, a signature pattern for each photosensitive film is set in the job management process of step S4 in FIG. 2. When the process worker specifies a job name, all pages specified by the job name are recorded on the photosensitive film based on the signature pattern. This further improves working efficiency.

There may be many changes, modifications, and alterations without departing from the scope or spirit of essential characteristics of this invention, and it is thereby clearly understood that the above described embodiment is only illustrative and not restrictive in any sense. The spirit and scope of the present invention is only limited by the terms of the appended claims.

What is claimed is:

1. A reproduction process apparatus for executing a variety of reproduction-related processes, said apparatus comprising:

a memory for storing a plurality of page construction data files, each of said page construction data files having a name and including page layout data and image part data, said page layout data representing positions of a plurality of image parts laid out on one page, said positions being individually selectable by an operator of said apparatus, said image part data representing said plurality of image parts;

a working memory for storing data used in execution of each of said variety of reproduction-related processes;

a hierarchical memory for storing first hierarchy data including a plurality of job names each representing a print, second hierarchy data including a plurality of page numbers, and third hierarchy data including a plurality of said names of said page construction data files, each of said plurality of job names having at least one page number as said second hierarchy data, each of said plurality of page numbers having at least one of said names of said page construction data files as said third hierarchy data;

page number specification means for selecting a specific page number from said plurality of page numbers; and data transfer means for comparing said specific page number with said second hierarchy data to extract at least one name of said page construction data files corresponding to said specific page number according to said third hierarchy data and for transferring page construction data files specified by said at least one name of said page construction data files from said memory to said working memory.

2. A reproduction process apparatus in accordance with claim 1, further comprising:

a plurality of process means for individually executing said variety of reproduction-related processes;

process specification means for specifying a certain process; and selection means for selecting specific process means for executing said certain process from said plurality of process means and activating said specific process means to execute said certain process according to data stored in said working memory.

3. A reproduction process apparatus in accordance with claim 2, wherein said plurality of process means comprises process information specification means for setting desirable process information, said process information including first, second and third process titles, said first process title indicating a process of producing an overlapping area between two image parts, said second process title indicating a process of making a margin of a predetermined width around a contour of an image part, said third process title indicating a process of printing a black character over a background.

4. A reproduction process apparatus in accordance with claim 1, further comprising:

picture image scanning means for scanning at least one picture image in an original to capture picture data;

linework image scanning means for scanning at least one linework to capture linework data; and layout data input means for tracing a line in a mechanical layout sheet to input said page layout data.

5. A reproduction process apparatus in accordance with claim 1, further comprising:

icon display means for displaying each of said plurality of page numbers as an icon; and wherein said page number specification means further comprises icon movement monitoring means for monitoring a movement of said icon moved by an operator.

6. A reproduction apparatus in accordance with claim 5, wherein the data transfer means comprises a target icon on said display, said icon moved by said operator being movable to said target icon.

7. A reproduction process apparatus for executing a variety of reproduction-related processes, said apparatus comprising:

a memory for storing a plurality of page construction data files, each of said page construction data files having a name and including page layout data and image part data, said page layout data representing positions of a plurality of image parts laid out on one page, said positions being individually selectable by an operator of said apparatus, said image part data representing said plurality of image parts;

a working memory for storing data used in execution of each of said variety of reproduction-related processes;

a hierarchical memory for storing first hierarchy data including a plurality of job names each representing a print, second hierarchy data including a plurality of page numbers, and third hierarchy data including a plurality of said names of said page construction data files, each of said plurality of job names having at least one page number as said second hierarchy data, each of said plurality of page numbers having at least one of said names of said page construction data files as said third hierarchy data;

job name specification means for selecting a specific job name out of said plurality of job names; and data transfer means for comparing said specific job name with said first hierarchy data to extract all names of said page construction data files corresponding to said specific job name according to said second hierarchy data and said third hierarchy data, and for transferring page construction data files specified by said all names of said page construction data files from said memory to said working memory.

8. A reproduction process apparatus in accordance with claim 7, further comprising:

a plurality of process means for individually executing said variety of reproduction-related processes;

process specification means for specifying a certain process; and selection means for selecting specific process means for executing said certain process from said plurality of process means and activating said specific process means to execute said certain process according to said data stored in said working memory.

9. A reproduction process apparatus in accordance with claim 8, wherein said plurality of process means comprises process information specification means for setting desirable process information, said process information including first, second and third process titles, said first process title indicating a process of producing an overlapping area between two image parts, said second process title indicating a process of making a margin of a predetermined width around a contour of an image part, said third process title indicating a process of printing a black character over a background.

10. A reproduction process apparatus in accordance with claim 8, further comprising:

pattern memory for storing a signature pattern representing a page signature pattern on each printing plate; and wherein said plurality of process means comprises output means for outputting said page construction data according to signature data;

said output means further comprising signature data layout means for allocating said page construction data files corresponding to said all names transferred to said working memory to said signature data for each page according to said signature pattern.

11. A reproduction process apparatus in accordance with claim 7, further comprising:

picture image scanning means for scanning at least one picture image in an original to capture picture data;

linework image scanning means for scanning at least one linework to capture linework data; and layout data input means for tracing a line in a mechanical layout sheet to input said page layout data.

12. A reproduction process apparatus in accordance with claim 7, further comprising:

icon display means for displaying each of said plurality of job names as an icon; and wherein said job name specification means further comprises icon movement monitoring means for monitoring a movement of said icon moved by an operator of said apparatus.

13. A reproduction apparatus in accordance with claim 12, wherein the data transfer means comprises a target icon on said display, said icon moved by said operator being movable to said target icon.

14. A method of executing a variety of reproduction-related processes, said method comprising:

step (a) of storing a plurality of page construction data files, each of said page construction data files having a name and including page layout data and image part data, said page layout data representing positions of a plurality of image parts laid out on one page, said positions being individually selectable by an operator of said apparatus, said image part data representing said plurality of image parts;

step (b) of preparing a working memory for storing data used in execution of each of said variety of reproduction-related processes;

step (c) of storing first hierarchy data including a plurality of job names each representing a print, second hierarchy data including a plurality of page numbers, and third hierarchy data including a plurality of said names of said page construction data files, each of said plurality of job names having at least one page number as said secondary hierarchy data, each of said plurality of page numbers having at least one of said names of said page construction data files as said third hierarchy data;

step (d) of selecting a specific page number out of said plurality of page numbers; and step (e) of comparing said specific page number with said second hierarchy data to extract at least one name of said page construction data files corresponding to said specific page number according to said third hierarchy data and for transferring page construction data corresponding to said at least one of said names of said page construction data files to said working memory.

15. A method in accordance with claim 14, further comprising:

step (f) of preparing a plurality of process units for individually executing said variety of reproduction-related processes;

step (g) of specifying a certain process; and step (h) of selecting a specific process unit for executing said certain process out of said plurality of process units and activating said specific process unit to execute said certain process according to data stored in said working memory.

16. A method in accordance with claim 15, wherein said step (f) further comprises preparing a process information specification unit for setting desirable process information, said process information including first through third process titles, said first process title indicating a process of producing an overlapping area between two image parts, said second process title indicating a process of making a margin of a predetermined width around a contour of an image part, said third process title indicating a process of printing a black character over a background.

17. A method in accordance with claim 14, further comprising:

step (i) of scanning at least one picture images in an original to capture picture data;

step (j) of scanning at least one linework to capture linework data; and step (k) of tracing a line in a mechanical layout sheet to input said page layout data.

18. A method in accordance with claim 14, further comprising:

step (l) of displaying each of said plurality of page numbers as an icon;

wherein said step (d) further comprises monitoring a movement of said icon moved by the operator.

19. A method in accordance with claim 18, wherein said step (e) further comprises:

displaying a target icon on said display; and moving said icon moved by the operator to said target icon.

20. A method of executing a variety of reproduction-related processes, said method comprising:

step (a) of storing a plurality of page construction data files, each of said page construction data files having a name and including page layout data and image part data, said page layout data representing positions of a plurality of image parts laid out on one page, said positions being individually selectable by an operator of said apparatus, said image part data representing said plurality of image parts;

step (b) of preparing a working memory for storing data used in execution of each of said variety of reproduction-related processes;

step (c) of storing first hierarchy data including a plurality of job names each representing a print, second hierarchy data including a plurality of page numbers, and third hierarchy data including a plurality of said names of said page construction data files, each of said plurality of job names having at least one page number as said secondary hierarchy data, each of said plurality of page numbers having at least one of said names of said page construction data files as said third hierarchy data;

step (d) of selecting a specific page number out of said plurality of page numbers; and step (e) of comparing said specific page number with said first hierarchy data to extract all names of said page construction data files corresponding to said specific job name from said second hierarchy data and said third hierarchy data, and transferring said extracted page construction data files corresponding to said all names of said page construction data files to said working memory.

21. A method in accordance with claim 20, further comprising:

step (f) of preparing a plurality of process units for individually executing said variety of reproduction-related processes;

(g) specifying a certain process; and (h) selecting a specific process unit for executing said certain process out of said plurality of process units and activating said specific process unit to execute said certain process according to data stored in said working memory.

22. A method in accordance with claim 21, wherein said step (f) further comprises preparing a process information specification unit for setting desirable process information, said process information including first, second and third process titles, said first process title indicating a process of producing an overlapping area between two image parts, said second process title indicating a process of making a margin of a predetermined width around a contour of an image part, said third process title indicating a process of printing a black character over a background.

23. A method in accordance with claim 21, further comprising:

step (i) storing a signature pattern representing a page signature pattern on each printing plate;

wherein said step (f) further comprises preparing an output unit for outputting said page construction data files according to signature data, and allocating all page construction data files corresponding to said all names transferred to said working memory to said signature data for each page according to said signature pattern.

24. A method in accordance with claim 20, said method further comprising:

step (k) of scanning at least one picture images in an original to capture picture data;

step (l) of scanning at least one linework to capture linework data; and step (m) of tracing a line in a mechanical layout sheet to input said page layout data.

25. A method in accordance with claim 20, further comprising:

step (n) of displaying each of said plurality of job names as an icon; and wherein said step (d) further comprises monitoring a movement of said icon moved by an operator.

26. A method in accordance with claim 25, wherein said step (e) further comprises:

displaying a target icon on said display; and moving said icon moved by the operator to said target icon.

27. A reproduction process apparatus for executing a variety of reproduction-related processes, said apparatus comprising:

a memory for storing a plurality of page construction data files, each of said page construction data files having a name and including page layout data and image part data, said page layout data representing positions of a plurality of image parts laid on one page, said image part data representing said plurality of image parts;

a working memory for storing data used in execution of each of said variety of reproduction-related processes;

a hierarchical memory for storing first hierarchy data including a plurality of job names each representing a print, second hierarchy data including a plurality of page numbers, and third hierarchy data including a plurality of said names of said page construction data files, each of said plurality of job names having at least one page number as said second hierarchy data, each of said plurality of page numbers having at least one of said names of said page construction data files as said third hierarchy data;

page number specification means for selecting a specific page number from said plurality of page numbers; and data transfer means for comparing said specific page number with said second hierarchy data to extract at least one name of said page construction data files corresponding to said specific page number according to said third hierarchy data and for transferring page construction data files specified by said at least one name of said page construction data files from said memory to said working memory, said data transfer means comprising display icons representing said plurality of page numbers and movable onto a target icon.

28. A reproduction process apparatus for executing a variety of reproduction-related processes, said apparatus comprising:

a memory for storing a plurality of page construction data files, each of said page construction data files having a name and including page layout data and image part data, said page layout data representing positions of a plurality of image parts laid on one page, said image part data representing said plurality of image parts;

a working memory for storing data used in execution of each of said variety of reproduction-related processes;

a hierarchical memory for storing first hierarchy data including a plurality of job names each representing a print, second hierarchy data including a plurality of page numbers, and third hierarchy data including a plurality of said names of said page construction data files, each of said plurality of job names having at least one page number as said second hierarchy data, each of said plurality of page numbers having at least one of said names of said page construction data files as said third hierarchy data;

job name specification means for selecting a specific job name out of said plurality of job names; and data transfer means for comparing said specific job name with said first hierarchy data to extract all names of said page construction data files corresponding to said specific job name according to said second hierarchy data and said third hierarchy data, and for transferring page construction data files specified by said all names of said page construction data files from said memory to said working memory, said data transfer means comprising display icons representing said plurality of job names and movable onto a target icon.

29. A method of executing a variety of reproduction-related processes, said method comprising:

step (a) of storing a plurality of page construction data files, each of said page construction data files having a name and including page layout data and image part data, said page layout data representing positions of a plurality of image parts laid on one page, said image part data representing said plurality of image parts;

step (b) of preparing a working memory for storing data used in execution of each of said variety of reproduction-related processes;

step (c) of storing first hierarchy data including a plurality of job names each representing a print, second hierarchy data including a plurality of page numbers, and third hierarchy data including a plurality of said names of said page construction data files, each of said plurality of job names having at least one page number as said secondary hierarchy data, each of said plurality of page numbers having at least one of said names of said page construction data files as said third hierarchy data;

step (d) of selecting a specific page number out of said plurality of page numbers; and step (e) of comparing said specific page number with said second hierarchy data to extract at least one name of said page construction data files corresponding to said specific page number according to said third hierarchy data and for transferring page construction data corresponding to said at least one of said names of said page construction data files to said working memory, by displaying at least some of said plurality of page numbers as icons, and moving said icons onto a target icon.

30. A method of executing a variety of reproduction-related processes, said method comprising:

step (a) of storing a plurality of page construction data files, each of said page construction data files having a name and including page layout data and image part data, said page layout data representing positions of a plurality of image parts laid on one page, said image part data representing said plurality of image parts;

step (b) of preparing a working memory for storing data used in execution of each of said variety of reproduction-related processes;

step (c) of storing first hierarchy data including a plurality of job names each representing a print, second hierarchy data including a plurality of page numbers, and third hierarchy data including a plurality of said names of said page construction data files, each of said plurality of job names having at least one page number as said secondary hierarchy data, each of said plurality of page numbers having at least one of said names of said page construction data files as said third hierarchy data;

step (d) of selecting a specific page number out of said plurality of page numbers; and step (e) of comparing said specific page number with said first hierarchy data to extract all names of said page construction data files corresponding to said specific job name from said second hierarchy data and said third hierarchy data, and transferring said extracted page construction data files corresponding to said all names of said page construction data files to said working memory, by displaying at least some of said plurality of job names using icons, and moving said icons onto a target icon.

* * * * *